J. BUTTER.
Mower.
No. 27,034. Patented Feb. 7, 1860.
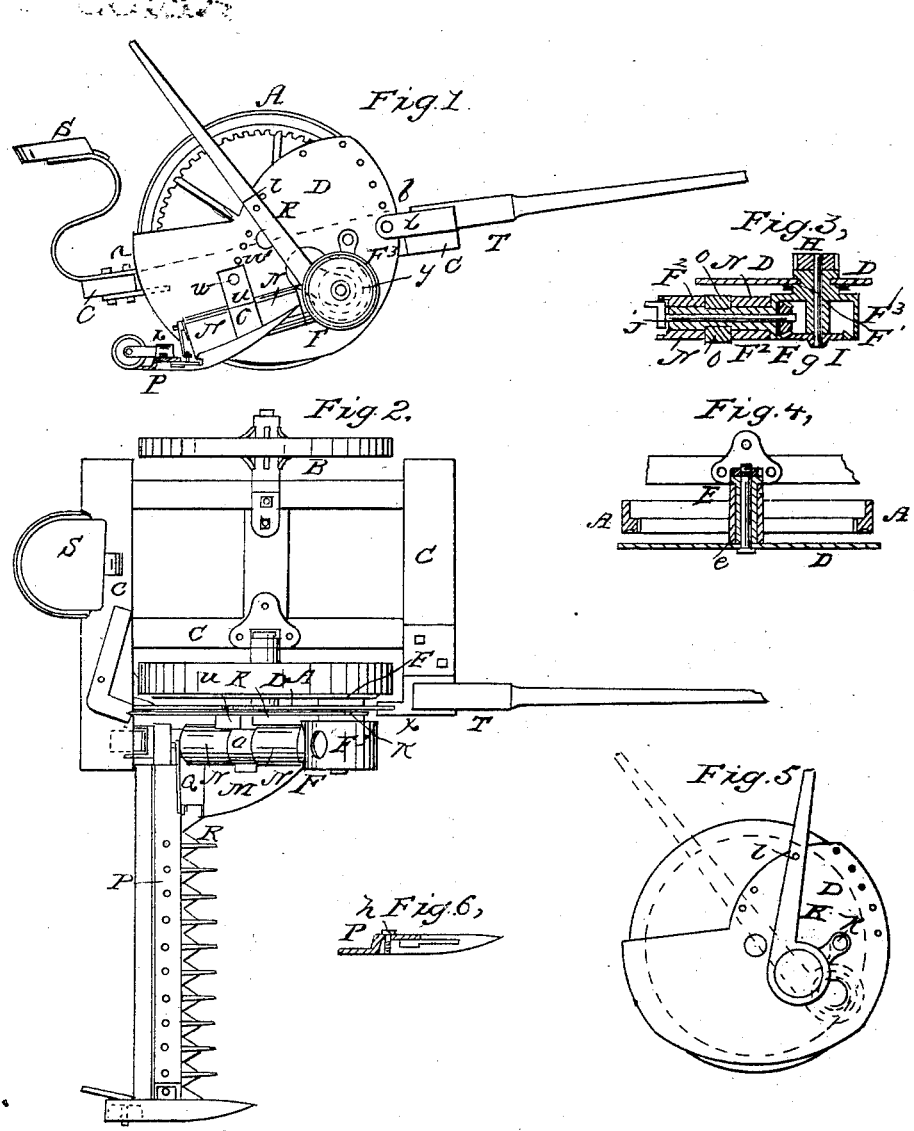
INVENTOR:
John Butter

UNITED STATES PATENT OFFICE.

JOHN BUTLER, OF BUFFALO, NEW YORK.

IMPROVEMENT IN MOWING AND REAPING MACHINES.

Specification forming part of Letters Patent No. 27,034, dated February 7, 1860.

*To all whom it may concern:*

Be it known that I, JOHN BUTLER, of the city of Buffalo, in the county of Erie and State of New York, have invented certain new and useful Improvements in Mowers and Reapers; and I do hereby declare that the following is a full, clear, and exact description of the construction and operation of the same, reference being had to the accompanying drawings, and the letters of reference marked thereon, in which—

Figure I is a side elevation of my improvement; Fig. II, a plan of the same. Fig. III is a section on line $x\,y$. Fig. IV is a section on line $a\,b$. Fig. V is an elevation of the adjusting-plate and lever. Fig. VI is a cross section of finger-bar.

A is the driving-wheel.

B is the outside supporting-wheel.

C is the main frame of the machine. The driving and supporting wheels turn on separate axles bolted to the main frame on a line with each other.

D is an adjusting and supporting plate lying parallel to the plane of the driving-wheel. The bolt $e$, passing through the axle E of the driving-wheel, supports the plate and forms the axle upon which it turns to adjust the cutters.

F is the gear-frame, in which is placed the gearing which transmits motion from the driving-wheel to the cutters. It consists of a tubular arm, F′, passing through the plate D, at right angles thereto, and through which the shaft $g$ of the pinion H and bevel-wheel I passes, having journal-bearings therein, (see Fig. III,) and a tubular arm, F², lying parallel to the plate D, and connected to the tubular arm F′ by the hollow cylindrical part F³, which incloses the bevel-wheel I and pinion J. (See Fig. III.) The crank and bevel-pinion shaft J′ passes through the tubular arm F², having journal-bearings therein. (See Fig. III.)

K is a bent lever, the shorter arm of which is connected to the plate D by the bolt $k$, forming the fulcrum upon which it operates. A slot is made in the plate D, enlarged at the end nearest the center of the plate to the size of the tubular arm F′. The collar formed at the angle of the two arms of the lever, when the lever is thrown forward to the position shown in Fig. V, will be concentric and coincide with the enlarged part of the slot in the plate. The tubular arm F′ may then be inserted through the collar and plate, when, by throwing the lever back to the position shown in Fig. I, and by the dotted lines, Fig. V, the tubular arm will be carried into the slot, the plate entering an annular groove formed around the arm and connecting the gear-frame to the plate. When in this position the pinion H will be in gear with the teeth of the driving-wheel. A pin, $l$, projecting from the lever and catching into a hole in the plate, will hold the lever firmly in this position and prevent the gear-frame from moving laterally, and keep the pinion in gear with the driving-wheel; but by uncatching the lever and throwing it forward a short distance the pinion will be thrown out of gear with the driving-wheel, and be held in that position as long as desired by the pin $l$ catching into another hole in the plate and holding the lever. By throwing the lever forward into the position shown in Fig. V the gear-frame may be disconnected for shipment.

M is the inside shoe or frame to which the finger-bar is attached. It is connected to the gear-frame by the tubular arm F², passing through the sleeves N, raised up from the shoe in front of the finger-bar.

O is a collar or sleeve placed around the tubular arm, which arm has a groove formed around it to receive said collar and filling the space between the sleeves N, and thereby holding the said sleeves N in their proper place on the tubular arm.

P is a finger-bar bolted to the shoe M. It is made in the form shown in Fig. VI. It consists of two flat parallel parts connected by a part at right angles, or nearly so, to them. The lower part runs upon the ground, the guard being connected to the upper part by the screw or rivet $p$.

Q is the connecting-rod connecting the crank to the cutters. R are the cutters; S, driver's seat, placed on the rear of the main frame C, so that the weight of the driver will balance the weight of the pole T.

The connection of the shoe to the tubular arm F² allows the outer end of the finger-bar to rise and fall in passing over uneven ground, independent of the position of the driving and supporting wheels, and as it turns upon the center line of the crank-shaft the throw of the cutters through the guards will always be the same, whatever may be the position of the finger-bar. The finger-bar may also be thrown over against the plate when the machine is to be moved from field to field, or detached, as before described, and laid on the main frame C, between the wheels. The connection of the gear-frame to the plate D by the tubular arm passing through the plate, as before described, will allow the whole finger-bar to rise and fall in passing over uneven ground or through dead-furrows.

When the machine is to be converted into a reaper the finger-bar is raised to the desired height, turning on the arm F', and is held there by a bolt, $u$, passing through the upward projection $u'$ from the collar O, and through one of the series of holes, $w$, made in the plate. When raised in this way the points of the cutters will pitch downward; but by turning the plate on its axle-bolt $e$ by means of the lever K they may be brought on a level, and by passing a bolt through the plate and bracket X, secured to the front cross-piece of the frame C, the plate will be held in the required position. When moving, the points of the cutters may be elevated to pass over obstructions by the driver, by means of the lever K, turning the plate on its axle, as described, for leveling the cutters.

What I claim as my invention, and desire to secure by Letters Patent, is—

1. The adjusting and supporting plate D, in combination with the tubular arm F' and lever K, in the manner and for the purpose substantially as described.

2. The gear-frame F, which consists mainly of the tubular arms F' and $F^2$, the hollow cylindrical part $F^3$, collar O, and upward projection $u'$, constructed, arranged, and operating in the manner and for the purposes substantially as herein set forth.

3. The combination of the shoe M, gear-frame F, and plate D, connected together in the manner and for the purpose substantially as herein described.

JOHN BUTLER.

Witnesses:
A. M. WHEELER,
W. H. FORBUSH.